United States Patent [19]

Bates

[11] 3,769,535

[45] Oct. 30, 1973

[54] ELECTRICAL CURRENT COLLECTING DEVICES

[75] Inventor: James John Bates, Shrivenham, England

[73] Assignee: National Research Development Corporation, London, England

[22] Filed: Nov. 19, 1971

[21] Appl. No.: 200,550

[30] Foreign Application Priority Data
Nov. 20, 1970 Great Britain.................. 55,266/70

[52] U.S. Cl................................. 310/219, 310/241
[51] Int. Cl. ............................................ H02k 13/00
[58] Field of Search................... 310/219, 231, 178, 310/232, 241, 224, 229, 248, 230, 251, 252, 253; 318/138

[56] References Cited
UNITED STATES PATENTS

| | | | |
|---|---|---|---|
| 3,544,868 | 12/1970 | Bates................................. | 318/138 |
| 3,648,088 | 3/1972 | Wilkin .............................. | 310/219 |
| 2,785,364 | 3/1957 | Lane................................... | 310/241 |
| 3,341,726 | 9/1967 | Brinster ............................ | 310/219 |
| 3,382,387 | 5/1968 | Marshall............................ | 310/219 |
| 1,670,030 | 5/1928 | Fynn.................................. | 310/241 |
| 3,375,479 | 3/1968 | Lowe................................. | 310/232 |

Primary Examiner—R. Skudy
Attorney—Cushman, Darby & Cushman

[57] ABSTRACT

An electrical current-collecting device for passing high currents between relatively fast moving conductors is in the form of a circular brush having projecting conducting bristles and mounted on a spindle about which it is rotated with the bristles in contact with a moving conductor so that the relative speed between the conductor and the bristles is relatively small and good electrical conduction is achieved. The current may then be passed on to a second, normally stationary, conductor through the spindle made of conducting material and much smaller in diameter than the brush so that contact with the second conductor can be made at relatively low speed.

9 Claims, 12 Drawing Figures

PATENTED OCT 30 1973 3,769,535

ELECTRICAL CURRENT COLLECTING DEVICES

This invention relates to electric current-collecting devices.

Electric currents have been collected from a rotary conductor by means of a stationary brush, but the relative movement of the brush and conductor leads to wear, which is a particularly deleterious when high speed rotation is involved as would be the case in a large turbo-alternator. In addition, such an arrangement may have a considerable voltage drop between the conductor and the brush, and such a voltage drop may not be tolerable, for example in a homopolar machine which generates at a low voltage so that a very heavy current must be collected.

Electric currents have also been collected by a freely rotating wheel such as that described in U.S. Pat. No. 3,544,868 but at high speeds such a wheel may not provide satisfactory contact due to small particles trapped between the wheel and the surface on which it runs.

According to the invention, an electrical current-collecting device for conducting electrical current between first and second relatively movable conductors, said device comprising a circular brush having a plurality of projecting conducting bristles and arranged to be rotatable with the ends of the bristles in electrical contact with the said first conductor so that the relative velocity between the free ends of the bristles and the first conductor is much smaller than the rate of relative movement between said first and second conductors, the device also having a contactor for making an electrical connection with the said second conductor at a relative velocity substantially smaller than the relative velocity between the first and second conductors. Preferably the bristles of the brush project radially.

The said first conductor may be a fixed linear conductor, when the circular brush may rotate about a spindle perpendicular to the linear conductor, the spindle being moved in the direction of the conductor. However, more usually the said first conductor will be a rotary conductor rotating about an axis either parallel to the axis of rotation of the circular brush, when contact may be made over the annular surfaces of the brush and rotary conductor, or perpendicular to the axis of rotation of the brush, when the annular surface of the brush may make contact with a flat face of the conductor.

In a particularly advantageous embodiment of the invention, the circular brush is mounted on a contactor comprising an electrically conducting spindle of substantially smaller diameter than the circular brush and contact is made between the spindle and a second conductor comprising a stationary brush, the peripheral speed of the spindle being substantially lower than that of the circular brush so that rubbing wear is small. If necessary the spindle may be arranged to make contact with the circular brush of a similar current-collecting device and further brushes and spindles sequentially so that the peripheral speed of the last spindle in the train is sufficiently low to allow contact with a stationary brush at acceptably low rubbing speed.

Alternatively the circular brush may be mounted on a conducting spindle one end of which is immersed in a container of electrically conducting fluid such as mercury or a mass of electrically conductive powder which may possibly be fluidised by the passage through it of a current of air, and static electrical contact can then be made between the container and a second electrical conductor.

The circular brush and the first conductor, when rotary, are preferably each independently driven, either by separate servo-controlled electric motors or by gearing. Alternatively, the circular brush may be driven by frictional engagement with the first conductor. The rotary first conductor may be a slip ring, when use of metal bristles for the rotary brush is advantageous, or may be a commutator when use of carbon fibre bristles is preferable to give a more progressive change in resistance as the brush moves from segment to segment.

While the electrical contact between the bristles of the circular brush and the first conductor is satisfactory if the brush is rotating at sufficiently high speed for the bristles to be pressed against the first conductor by centrifugal force, at low speeds there may be insufficient centrifugal force to make good contact. The bristles cannot be forced against the conductor by spring pressure since excessive distortion would result. It may therefore be advantageous to use a circular brush according to the invention in conjunction with a solid circular brush or wheel arranged so that the wheel can act as a conductor at low speeds and the bristles can act as a conductor at high speeds. Such an arrangement may be used when it is desired to pass high currents between relatively moving parts when the rate of relative movement varies over a wide range. The arrangement is particularly advantageous since at high speed a wheel may not provide satisfactory contact as very small particles may be trapped between the wheel and the surface on which it runs, but the wire brush will provide protection against such loss of contact. In addition the wheel may be pressed against the first conductor with such force that it may act as a frictional drive by which the wheel and brush may be rotated.

An important feature of the invention is that it may be applied to a cascaded homopolar machine such as a multi-disc type machine when successive discs may be connected by a current collector in accordance with the invention. Similarly a current-collecting device may be used in a segmented type of cascaded homopolar machine and such a current-collecting device is particularly useful for homopolar machines using superconducting field coils.

Another important feature of the invention is that the device may be used in a dynamo-electric machine to provide a commutation arrangement in which a commutator having segments of conducting material separated by segments of insulating material is contacted by a circular brush or brushes as contact members. The machine may comprise thyristor-assisted commutation arrangements such as described, for example, in U.S. Pat. No. 3,453,513.

The invention will now be described by way of example only with reference to the drawings filed with this specification in which.

Figure 7:
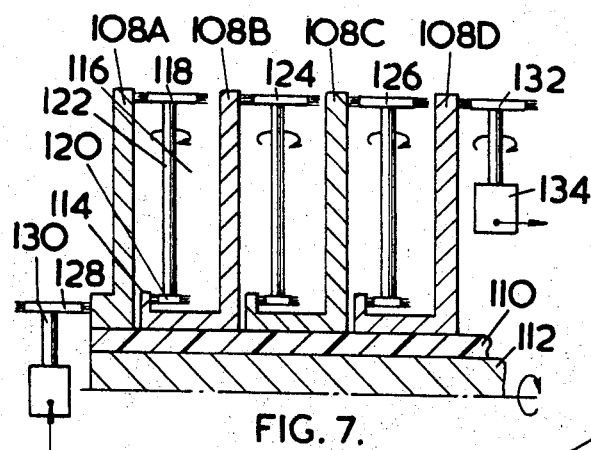
Figure 9A:
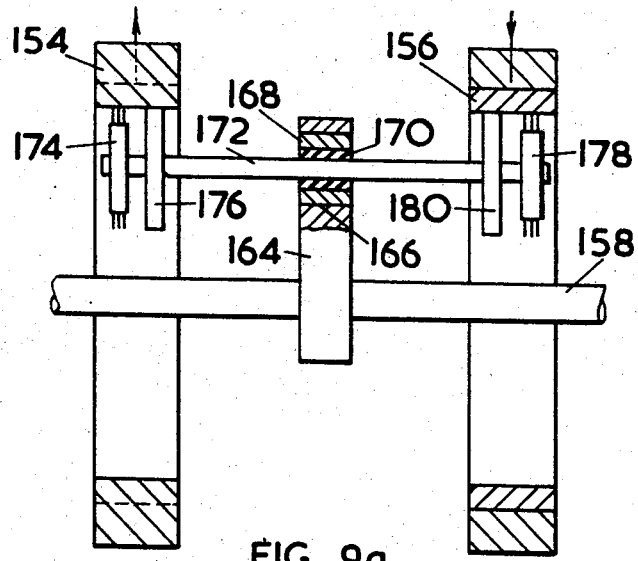
Figure 9B:
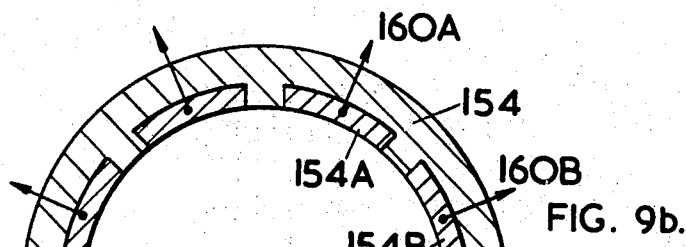
Figure 9C:
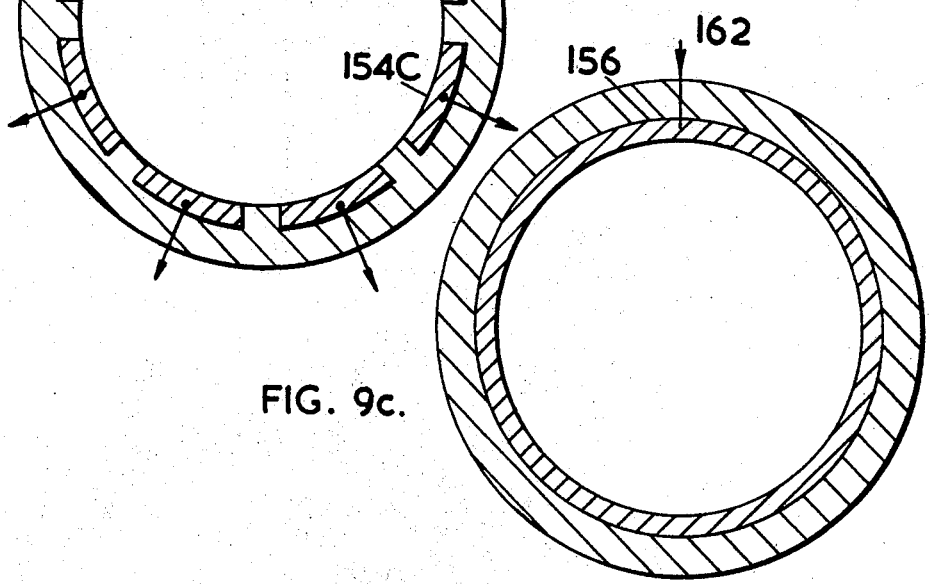

FIGS. 7 and 8 a,b illustrate schematically use of current collectors in multiple-disc and segmented-disc type cascaded homopolar machines respectively;

FIG. 9a illustrates schematically use of a current collector to transfer current between a slip ring and a commutator; and FIGS. 9b and 9c illustrate sections through the slip ring and commutator of FIG. 9a.

Figure 1:
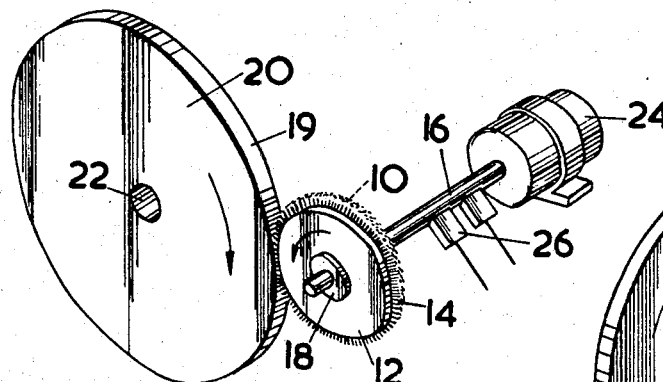
FIGS. 1 and 2 illustrate two embodiments of a current collector according to the invention.

In FIG. 1, a mass of fine copper bristles forming a circular brush 10, project radially from and are clamped between two metal discs 12, 14 secured on a metal spindle 16 by two clamping members 18 of which only one can be seen. The brush 10 is in peripheral contact with a first conductor, in this case the rim 19 of a disc-shaped current generator 20 which is clamped to a spindle 22 which is rotated relative to a magnetic field, produced by means not illustrated, so as to generate a voltage radially of the disc 20. The spindle 16 is rotated by means of an electric motor 24, and stationary contacts 26 are arranged so as to be in contact with the spindle 16; the contacts 26 here being the second conductor.

The motor 24 is driven so as to rotate the spindle 16 so that the peripheral speeds of the rim 19 and the brush 10 are substantially equal and there is only a small relative velocity where the brush 10 touches the rim 19. The separation of the spindles 16 and 22 is such that the brush 10 lightly touches the rim 19 and there is metal to metal contact at many points. Thus if, for example, the overall diameter of the brush 10 is 6 inches, and the periphery of the brush 10 is one-half inch wide, the total peripheral area of the brush 10 is approximately 9 square inches. At any instant the actual brush area in contact with the rim 19, which area will depend upon the extent to which the periphery of the brush 10 is slightly flattened by contact with the rim 19, will be only a fraction of this but due to the rotation of the brush 10, the contact points will be continuously changing so that the effective peripheral area of such a brush will be equivalent to the 9 square inches of total peripheral area.

The difference between the diameters of the disc 20, the brush 10 and the spindle 16 may be such that the peripheral speed of spindle 16 is low enough for stationary contacts 26 to collect current from it without an unacceptable voltage drop and without an excessive rate of wear. For example if the disc 20 were the disc of a homopolar machine, 6 feet in diameter and run at 100 rpm, with a peripheral speed of over 1,800 feet per minute, a 6 inch diameter brush 10 could be driven at 1,200 rpm and the spindle 16 could be 1 inch diameter so that its peripheral speed would be 300 feet per minute. Due to the deflection of the bristles of the brush 10 by contact with the rim 19, by say one-eighth inch, the relative velocity of the brush 10 and rim 19 might be of the order 60 feet per minute which would provide a desirable sliding and cleaning action without excessive wear.

Figure 2:
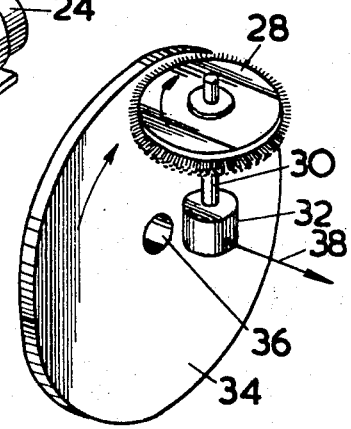

FIG. 2 illustrates schematically an alternative construction in which a brush 28, of the same general kind as that referenced 10 in FIG. 1, rotates on a vertical metal spindle 30, the lower end of which passes through a seal into a closed conductive pot 32, containing mercury in which the spindle 30 is immersed to make end and peripheral contact. The seal is of conventional kind and preferably there should be the usual provision for reducing deterioration of the mercury by oxidation. The brush 28 is in contact with the face of a disc-shaped current generator 34 and close to the rim thereof. The collector 34 is rotated about a spindle 36 by means not shown and the brush 28 is rotated by means of frictional contact with the generator 34, current passing from the generator 34 through the brush 28 and spindle 30 to the pot 32 and being collected by a contact indicated by reference 38.

Figure 3:
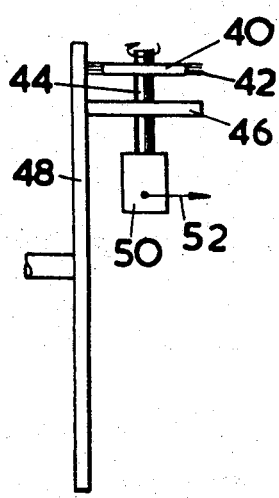
FIG. 3 illustrates a current collector in conjunction with a wheel-type current collector.

In FIG. 3, a brush 40 having bristles 42 is mounted on a spindle 44 which also carries a solid metal wheel 46 the diameter of which is slightly less than the peripheral diameter of the bristles 42. The bristles 42 and wheel 46 are in contact with a rotating disc 48 forming the first conductor. The spindle 44 projects into a conductive pot 50 which contains mercury and is in contact with a second conductor as indicated by reference 52. Pressure is applied to the spindle in the direction of the arrow P so that the wheel 46 presses against the disc 48 and as the disc rotates, provides friction drive for the spindle 44 and brush 40.

When the spindle 44 is rotated at low speeds, current passes from the disc 48 to the second conductor 52 through the wheel 46, because the bristles 42 are not in good contact with the disc 48. However at high speeds the bristles 42 are pressed against the disc 48 by centrifugal force and good contact is made so that current can pass through both the brush 40 and the wheel 46. If contact between the brush 46 and disc 48 is momentarily interrupted by particles trapped between them, as may easily occur at high speed, then the current passes through the brush 40 alone.

Figure 4:
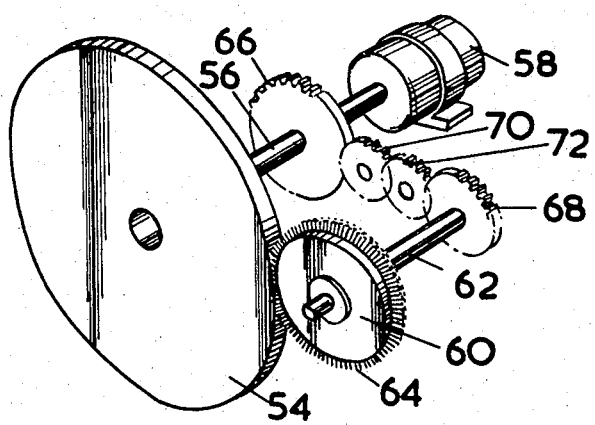
FIG. 4 illustrates a gear-driven current collector.

In FIG. 4, a disc-shaped current generator 54, from which current must be collected at the periphery, is fixed to a spindle 56 rotated by a motor 58. A circular brush 60 is attached to a spindle 62 arranged so that the bristles 64 of the brush 60 are in peripheral contact with the disc 54. The spindle 56 and 62 are parallel and carry gear wheels 66 and 68 respectively meshing with idler gear 70 and 72, the gear ratios being arranged so that the peripheral speeds of the disc 54 and bristles 64 are substantially equal.

Figure 5:
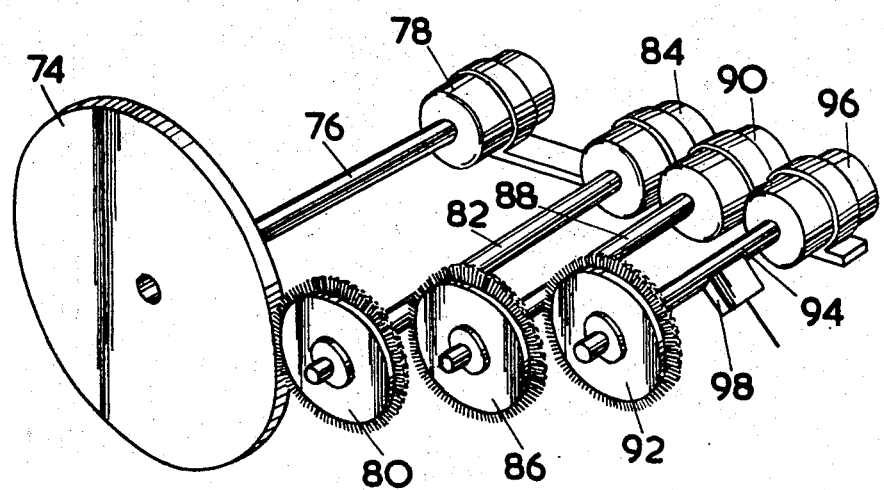
FIG. 5 illustrates a train of current collectors.

FIG. 5 illustrates a very high speed disc-shaped current generator 74 mounted on a spindle 76 rotated by a motor 78. The periphery of the disc 74 is in contact with the bristles of a circular brush 80 mounted on a spindle 82 rotated by a motor 84. Further brushes 86, 92 are mounted on spindles 88, 94 rotated by motors 90, 96 and the speeds of the motors 78, 84, 90 and 96 are arranged so that the velocities of the periphery of the bristles of brushes 80, 86 and 92 are substantially equal to the peripheral velocities of the disc 74 and the spindles 82 and 88 respectively. The velocity of spindle 94, the last spindle in the train, is very much slower than the velocity of disc 74 and contact can be made by a stationary brush 98 with acceptably low rubbing wear, the brush 98 here being the second conductor.

Figure 6:
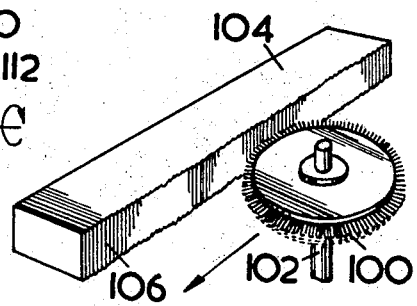
FIG. 6 illustrates current collection from a linear conductor.

In FIG. 6 a circular brush 100 rotates about a spindle 102, the brush 100 being in peripheral contact with a fixed conductor rail 104 forming the first conductor. The side of the rail 104 adjacent to the brush 100 is grooved as indicated by reference 106 to provide the equivalent of teeth. The spindle 102 is moved in the direction of the arrow and the brush 100 engages the grooves 106 so that the brush 100 is rotated by frictional force. Such an arrangement could be used to conduct electric current from a conductor rail or wire to an electric vehicle, as on an electric tramway or railway.

It will be appreciated that arrangements for driving the current collectors and making contact with the second conductor in FIGS. 1 to 6 are interchangeable. For example the train of current collectors in FIG. 5 may be driven by gearing from a single motor, and in FIG. 3 the conducting pot may be replaced by a stationary brush.

In FIG. 7 a series of conductive discs 108 A, B, C, D are attached to an insulating cylinder 110 which is attached to a rotatable shaft 112, to form a cascaded homopolar machine. The disc 108B has an axial extension with a radial rim 114, and a current-collecting device 116 is arranged radially between discs 108A and 108B. The current-collecting device 116 has an outer large diameter brush 118 in contact with a face of disc 108A near its periphery and an inner small diameter brush 120 in contact with the radial rim 114 of disc 108B. The brushes 118, 120 are carried on a spindle 122 supported in bearings not illustrated, and which rotates in the direction indicated by the arrow; the diameters of the two brushes on the spindle 122 are in the same ratio as the radii of contact with the discs 108A, 108B.

Similarly, current collecting devices 124, 126 are arranged between discs 108B, 108C and 108C, 108D respectively. The brush 128 of an input current collecting device 130 is in contact with a part of disc 108A radially close to the shaft 112 and the brush 132 of an output current-collecting device 134 is in contact with the outer part of disc 108D, current-collecting devices 130 and 134 being of the mercury pot type already described with reference to FIG. 2.

In operation the current-collecting devices 118, 124, 126, 130 and 134 are all driven by friction with the discs 108 as the homopolar machine rotates. A current can be considered to flow from an external circuit to disc 108A from which it passes to current-collecting device 118, disc 108B, current-collecting device 124 and so on, the induced EMF building up between successive discs, and back to the external circuit through the current-collecting device 134.

Figure 8A:
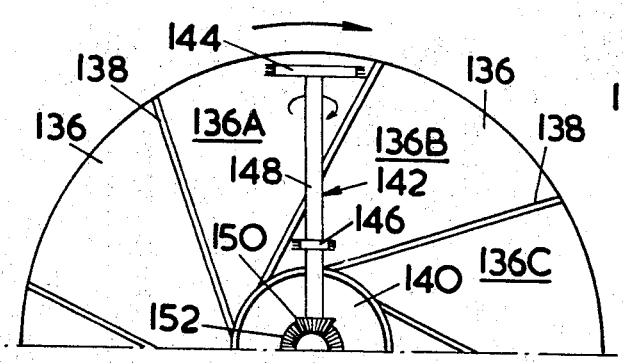
Figure 8B:
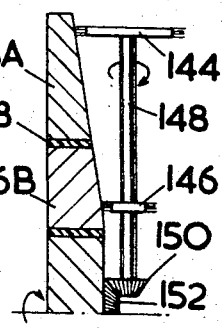

FIG. 8a shows part of a segmented-disc type homopolar machine and FIG. 8b illustrates a section through the disc of FIG. 8a. The disc 136 is made up of conducting sectors 136A, 136B and so on separated by insulating gaps 138, the disc rotating on a shaft 140. A number of current-collecting devices equal to the number of sectors less one are arranged radially. One current-collecting device 142 is shown, with a large diameter rotary brush 144 in contact with the outer part of a sector 136A and a small diameter rotary brush 146 in contact with the inner part of an adjacent sector 136B, the brushes 144, 146 rotating on a radial spindle 148; the insulating gaps 138 are inclined to the radial direction sufficiently to allow such an arrangement. The ratio of the diameters of the two rotary brushes 144, 146 is equal to the ratio of the radii of the two circles of contact on the disc 136; in order to keep the rotary brush spindle 148 perpendicular to the axis of the disc 136 while leaving room to accommodate the larger outer rotary brush 144, the disc 136 is either stepped (not shown) or tapered so that it is considerably thinner at its periphery where it is engaged by the radially outer brush (see FIG. 8b); or the disc may be formed hollow, ie as a shallow cone. A succession of such spindles and rotary brushes up to the number of sectors less one forms stationary connections which put each of the rotary sectors 136A, 136B and so on in series with the next one in a direction in which the EMF's induced will add up. Individual input and output rotary brushes (not shown) are provided corresponding to the last sector. The current collecting devices are driven by means of gears 150, 152 connected to the shaft 140.

In a further arrangement the sectored disc of FIG. 8 may be only one of several discs on a shaft, the connections between the discs also being made by current collectors.

In a more practical application of the invention to such homopolar machine as shown in FIGS. 8a and 8b a more complicated arrangement of wire brushes may be used to prevent the shorting out of adjacent segments as the brush crosses from one segment to another.

In FIG. 9a a commutator 154 and a slip ring 156 are arranged concentric with the shaft 158 of a rotary electric machine. The commutator 154 comprises conducting segments 154A, B, C etc as shown in FIG. 9b each connected to the armature windings on the stator (not shown) by electrical connections 160A, B, C etc. The slip ring, shown in section in FIG. 9c, is connected through connection 162 to one of the electrical supply terminals of the machine.

The rotor shaft 158 carries a cross-piece 164 which rotates with the shaft 158 and has a bore 166 containing a bearing 168 and a rubber bush 170 which supports a spindle 172. At one end the spindle 172 carries a circular brush 174 having bristles in contact with the inside surface of the commutator 154, and a wheel 176 also in contact with the commutator. Similarly a brush 178 and wheel 180 at the other end of the spindle 172 are in contact with the slip ring 156. The spindle 172 can rotate freely in the bearing 168 and the rubber bush 170 ensures good contact with the commutator 154 and slip ring 156.

As the shaft 158 rotates, the slip ring 156 is connected through the spindle 172 to each segment of the commutator 154 in turn. Since there is no sliding contact there is no possibility of the formation of conductive tracks between the commutator segments as would occur with carbon brushes. Thus it is possible to considerably increase the voltage applied to the armature winding of the machine without danger of flashover between adjacent commutator segments.

It will be appreciated that it is not essential to have both a circular brush and a wheel in contact with the commutator and slip ring. It may be possible, for example, to use a circular brush only in contact with the commutator and a solid wheel only in contact with the slip ring.

FIG. 9 is intended to indicate in a general way the use of a current-collecting device according to the invention in a rotary electrical machine. The invention may also be applied to other situations such as those described in more detail in U.S. Pat. No. 3,544,808.

The brushes so far described have the bristles projecting radially and presenting a cylindrical surface. For some purposes it may be possible or convenient to use an alternative construction in which the bristles around the rim of a brush disc project axially and provide a flat annular contact surface.

I claim:

1. An electrical device comprising first and second conductors at least the first of which is movable, and means for conducting an electrical current between said conductors comprising at least one circular brush having a plurality of projecting conducting bristles and having driving means wherein said circular brush is driven with the ends of the bristles in electrical contact with said first conductor at such a speed that the relative velocity between the free ends of the bristles and the first conductor is small compared with the rate of movement of the first conductor and having contact means for making an electrical connection with said second conductor.

2. An electrical device according to claim 1 in which any circular brush is mounted on a conducting spindle of substantially smaller diameter than the brush, the spindle comprising the contact means for making electrical contact with the said second conductor.

3. An electrical device according to claim 2 in which a solid wheel type of current collector of diameter slightly less than the diameter across the outer ends of the bristles of the circular brush is mounted on the spindle and makes electrical contact with the same conductor as the circular brush.

4. An electrical device according to claim 1 in which any circular brush and the conductor with which it is in electrical contact are independently driven.

5. An electrical device according to claim 1 in which any circular brush is driven by mechanical gearing with the drive means of the conductor with which said circular brush is in contact.

6. An electrical device according to claim 1 in which the first conductor is grooved so as to drive positively the circular brush with which it is in contact.

7. An electrical device according to Claim 1 in which between the first and second conductors there is at least one further device.

8. An electrical device according to claim 1 incorporated in a rotatable electrical machine.

9. An electrical device according to claim 1 in which the first and second conductors are each in contact with a circular brush having a plurality of projecting conducting bristles, whereby an electrical current can be conducted between said first and second conductors.

* * * * *